Sept. 22, 1953    F. KOPINSKI    2,653,281
ELECTROSTATIC CAPACITOR
Filed Oct. 10, 1950
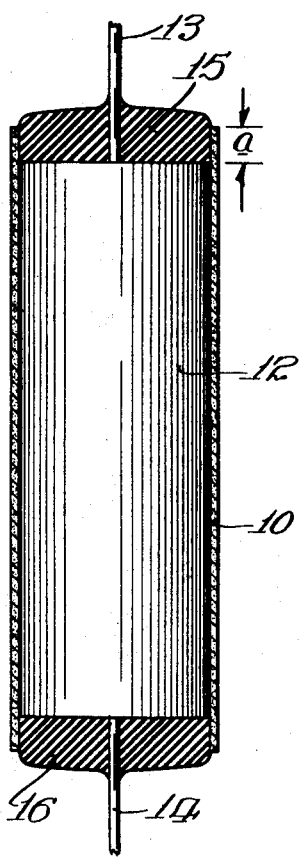
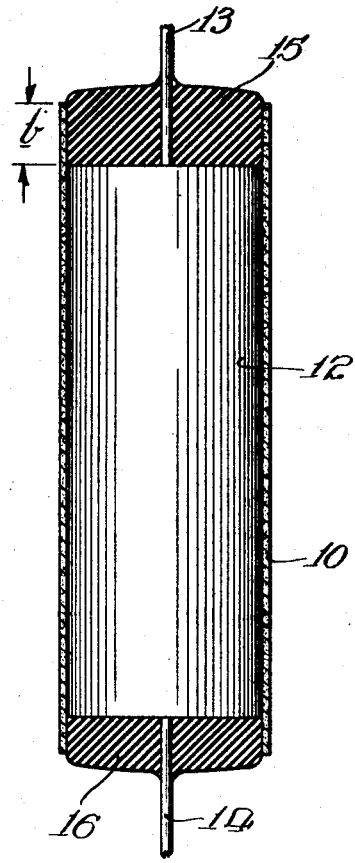
INVENTOR.
Frank Kopinski Patented Sept. 22, 1953

2,653,281

UNITED STATES PATENT OFFICE 2,653,281

ELECTROSTATIC CAPACITOR

Frank Kopinski, Chicago, Ill., assignor to John E. Fast & Co., Chicago, Ill., a corporation of Illinois Application October 10, 1950, Serial No. 189,389

3 Claims. (Cl. 317—260)

This invention which relates to electrostatic capacitors of the roll or wound type has to do more specifically with capacitors which are designed for use in locations where relatively high temperatures are encountered, as in television receivers.

It is common practice in the construction of wound capacitors to enclose the capacitor element, consisting of paper and foil strips, in a rigid paper tube and to close the two ends of the tube with a plug of suitable dielectric sealing compound consisting usually of an appropriate wax or wax mixture, or one or more of the several readily obtainable commercial synthetic resins, all of which are well known to the trade.

When such capacitors are manufactured for use in radio receivers no particular difficulty is encountered in sealing the ends; but with the advent of large scale television receiver production, and especially the production of receivers of highly compact design, temperatures very much higher than those obtaining in radio receivers are regularly encountered with the result that receiver manufacturers have been obliged to specify capacitors capable of withstanding temperatures of 100° C., and sometimes even more.

There has been no problem in the obtainment of satisfactory dielectric sealing compounds having flow points well above the maximum specified temperatures and possessing all other essential properties. The present invention is not concerned with the ingredients of the compound employed, assuming that it meets specified physical and electrical requirements, since that is a matter with which the manufacturers of such compounds have been able to cope successfully. What has proved to be a difficult problem has arisen in the attempt to provide, at each end of a wound capacitor, an impervious seal with a high flow point compound, irrespective of the composition thereof. In the production of such capacitors, where an operation of dipping in paraffin or the like is reserved to the very last, it is not possible to follow the established practice long employed in the manufacture of similar capacitors for the radio trade, modified only for the substitution of a dielectric sealing compound having a much higher flow point. In any such attempt a large percentage of the production will prove defective because of small openings, somewhat in the nature of pin holes, which develop in the last poured of the two seals. These openings or pin holes usually or frequently are extended entirely through the seal, thus affording a passageway for entry of moisture to the interior. Since the primary purpose of the seal is to exclude moisture, and thus forestall premature deterioration of the capacitor, it will be evident that even a single tiny opening cannot be tolerated.

In the course of various experimentations it was thought that the trouble was due to the high flow point of the many compounds which were tried, but without any success whatever. Finally I determined that the difficulty stemmed not from the make-up of the compound itself, but from the fact that its high temperature was expanding the air entrapped between the wound capacitor element and the surrounding tubular housing, and causing enough augmentation of internal pressure to produce blowouts which sometimes healed themselves and at other times did not. After ascertaining that this was the real cause of the trouble, it was then determined that if the depth of the troublesome seal were increased there might result enough resistance to the augmented internal pressure to prevent the occurrence of such blowouts. This has proven to be the complete solution to the problem, and has involved only a moderate increase in the over-all length of each capacitor to fully accomplish the purpose of this invention.

In the drawing which accompanies this specification:

Figure 1 is a longitudinal sectional view of a roll type capacitor according to the prior art; and Fig. 2 is a longitudinal sectional view of a roll type capacitor like that of Fig. 1 but modified in accordance with the present invention.

Referring first to the conventional prior art construction of Fig. 1, the capacitor therein illustrated comprises a rigid paper tube 10 within which is housed a roll type capacitor element 12, consisting ordinarily of interleaved strips of paper and metal foil and two terminal wires 13 and 14 which are connected interiorly to separate foils and extend to the outside, as shown. While the capacitor element 12 substantially fills the interior of the tubular housing, there is actually a clearance therebetween amounting to perhaps .030" in regular production. At this stage when assembly has taken place, a dipping operation in paraffin or the like is undesirable for various reasons among which is the reduced value of the bond that is later to be established with the end seals. For the purpose of shielding the capacitor against intrusion of moisture, the tube 10 is made somewhat longer than the capacitor element, and the resultant end cavities are filled, as shown, with a suitable dielectric sealing compound to form end seals 15 and 16.

Capacitors like that of Fig. 1 are used extensively in radio receivers where they are required to operate under maximum temperatures of about 70° C., and the flow point temperature of the compound forming the seals is low enough so that no problem arises such as that with which the present invention is concerned. This is true even though the depth $a$ of each cavity may be quite shallow, being usually no more than one-eighth inch. A greater depth than needed would, of course, be superfluous and wasteful, and would add unnecessarily to the cost of the product.

In attempting to utilize the construction of Fig. 1 in the manufacture of capacitors capable of withstanding an operating temperature of 100° C. instead of the former maximum of 70°, the substitution of a dielectric sealing compound having a proportionately higher flow point has produced no difficulty in satisfactorily sealing the first end to be filled. This operation is performed while the capacitor assembly is held in vertical position. This is due to the fact that any entrapped air expanded within the tube is free to escape through to the other end where no dipping operation has as yet taken place. In the attempt to seal the said other end of the tube, following a reversal of its position, the only avenue of escape for the expanded air is through the fluid sealing compound itself, and because of this tendency an overly large percentage of the production is often spoiled and must be discarded.

The construction of Fig. 2 which is illustrative of my present invention differs from that of Fig. 1 only in that the depth $b$ of the last-filled end cavity has been increased to such an extent that the weight of the plug of fluid compound therein is sufficient to counteract the augmented internal pressure resulting from the heating of the air entrapped between the wound capacitor element and the tubular housing therefor, the air being free otherwise to move along the outside of the capacitor element from end to end when a preliminary dipping operation has been dispensed with, as is desirable. Such an operation is a last step in the production of the present capacitor, and takes place after the end seals have been applied.

In order to withstand safely an operating temperature of 100° C. the dielectric sealing compound should have a flow point of about 110° C. and, of course, must be maintained at or somewhat above this temperature for pouring. I have determined experimentally that with the compound at a temperature of 110°–120° C. blowholes may consistently be avoided by making the depth $b$ of the last-filled cavity not substantially less than three-sixteenths inch. With that depth the weight of the fluid compound is sufficient to counteract with certainty the augmented pressure exerted by the entrapped air resulting from the rise in temperature thereof induced by the heat of the compound. The density of the compound used ranges from 1.45 to 1.50. This is not likely to vary to any considerable extent as between different suitable compounds but any increase or decrease of density is a factor to be taken into consideration in determining the minimum value of dimension $b$. Manifestly if the density of the compound is increased the dimension $b$ may be proportionately decreased, and the converse is equally true.

If a compound having a higher flow point is to be used it follows as a matter of course that the pressure exerted by the entrapped air will be augmented as a result of the higher temperature to which it is subjected and, other things being equal, that the minimum dimension $b$ may have to be increased consistently, although not necessarily to a proportionate degree.

In specifying the minimum dimension $b$ as three-sixteenths inch where the conditions stated obtain, I wish it to be understood that this is a practical and not an absolutely limiting figure, although it is close to the limit. Thus, in stating that the dimension $b$ is not substantially less than three-sixteenths inch, I have in mind that the dimension referred to could be slightly decreased without departing from the scope of my invention, but that the concomitant likelihood of unduly increasing the number of rejects generally would render such practice of doubtful advantage.

As will immediately be apparent to those skilled in the art, it is very easy to determine by trial, in each instance, the practicable minimum for dimension $b$ for higher temperatures and compounds having various densities, and it will be evident that such trial determinations do not entail what may rationally be described as experimentation.

This case is a continuation in part of my application filed March 2, 1950, Ser. No. 147,254, now abandoned.

I claim:

1. An electrostatic capacitor comprising an undipped tubular housing and a wound capacitor element positioned within said housing and substantially filling the same diametrically while leaving unsealed any space therebetween for air to flow therethrough from end to end, said housing being longer than the element and extending therebeyond at both ends to form end cavities in communication with each other through the space between the tubular housing and the capacitor element and each of which is filled with solid dielectric sealing compound having a flow point above 100° C., the compound having been admitted successively to the cavities in the fluid state, the heat-expanded air escaping from the open end of the tubular housing at the first filling of the cavities and the last-filled of said cavities being at least of such depth, from the end of the housing to the adjacent end of the element, that the weight of the fluid compound therein, when filled, is sufficient to counteract the augmented internal pressure of the air entrapped between the tubular housing and the capacitor element resulting from the increased temperature thereof induced by the heat of the fluid compound, said dielectric seals being in direct intimate bonded engagement with said capacitor element.

2. In the manufacture of an electrostatic capacitor capable of withstanding an operating temperature of 100° C. or more, the herein described method consisting in arranging a wound capacitor element within an undipped tubular housing open at the ends and extending beyond the capacitor element to form end cavities and having a space between the tubular housing and the capacitor element providing an air passage establishing communication between the end cavities, forming a plug of the order of one-eighth inch in depth in one of the end cavities by filling the same with hot fluid dielectric sealing compound having a flow point above 100° C. while the cavity at the other end of the housing is open, allowing heat-expanded air to escape from the open end of the housing and thereby relieving the dielectric sealing compound in the filled cavity of augmented pressure so that no air bubbles will be forced through the relatively thin plug, thereafter filling the other end cavity of the tubular housing with the hot fluid dielectric sealing compound to a depth of at least three-sixteenth inch in order to counteract the augmented pressure of the entrapped air and prevent air bubbles passing through the seal of said last-filled cavity, and finally subjecting said sealed assembly to a first dip coating in a molten wax.

3. An electrostatic capacitor comprising a tubular housing and a wound capacitor element positioned within said housing and substantially filling the same diametrically while leaving unsealed any space therebetween for air to flow therethrough from end to end, said housing being longer than the capacitor element and extending therebeyond at both ends to form end cavities in communication with each other through the space between the tubular housing and the capacitor element, each end cavity of which is filled separately with solid dielectric sealing compound having a density of the order of 1.5 and a flow point above 100° C., the sealing compound having been introduced into said cavities in the fluid state, the heat-expanded air escaping from the open end of the tubular housing at the filling of the first end cavity, the seal in said first end cavity having a depth of the order of one-eighth inch and the seal in the last filled cavity having a depth of at least three-sixteenth inch so as to prevent blowouts through the fluid compound due to augmented pressure of the air entrapped between the tubular housing and the capacitor element resulting from the increased temperature thereof induced by the heat of the fluid dielectric sealing compound, said dielectric seals being in direct intimate bonded engagement with said capacitor element and the air space remaining between said capacitor element and the housing terminating directly in contact with said seals.

FRANK KOPINSKI.

References Cited in the file of this patent

UNITED STATES PATENTS

| Number | Name | Date |
|---|---|---|
| 2,183,550 | Deutschman | Dec. 19, 1939 |

FOREIGN PATENTS

| Number | Country | Date |
|---|---|---|
| 538,195 | Great Britain | July 24, 1941 |